United States Patent [19]

Darrow

[11] 4,023,251

[45] May 17, 1977

[54] METHOD OF MANUFACTURE OF COOLED TURBINE OR COMPRESSOR BUCKETS

[75] Inventor: Kenneth A. Darrow, Sprakers, N.Y.

[73] Assignee: General Electric Company, Schenectady, N.Y.

[22] Filed: July 30, 1975

[21] Appl. No.: 600,306

[52] U.S. Cl. .............................. 29/156.8 H; 29/424; 228/118; 228/215; 416/96 R

[51] Int. Cl.² .................................. B23P 15/04

[58] Field of Search ............... 29/156.8 B, 156.8 H, 29/424; 228/118, 214, 215, 172; 416/96, 232

[56] References Cited

UNITED STATES PATENTS

| | | | |
|---|---|---|---|
| 1,321,499 | 11/1919 | Armstrong | 29/424 |
| 2,641,439 | 6/1953 | Williams | 29/156.8 B |
| 2,957,230 | 10/1960 | Johnson | 228/118 |
| 3,610,811 | 10/1971 | O'Keefe | 228/215 |
| 3,848,307 | 11/1974 | Kydd | 29/156.8 H |

FOREIGN PATENTS OR APPLICATIONS

| | | | |
|---|---|---|---|
| 205,607 | 1/1957 | Australia | 29/156.8 H |

OTHER PUBLICATIONS

Clavez, E. W., et al., Solder Stop for Contact Pin, from IBM Technical Disclosure Bulletin, vol. 10, No. 1, June, 1967, p. 7.

Primary Examiner—C.W. Lanham
Assistant Examiner—Daniel C. Crane
Attorney, Agent, or Firm—Leo I. MaLossi; Joseph T. Cohen; Jerome C. Squillaro

[57] ABSTRACT

Before skins are brazed on airfoil cores having cooling channels recessed into the surfaces thereof, the surfaces of the cooling channel walls are covered with a layer of oxide material. The oxide formation selected is one that is not reducible in dry hydrogen. Thereafter, when the normally employed hydrogen or vacuum brazing operation is conducted to apply the airfoil skin, the oxide-covered sides of the cooling channels will not be wet by the molten braze alloy. Plugging of the covered cooling channels during manufacture is thereby greatly reduced.

12 Claims, 1 Drawing Figure

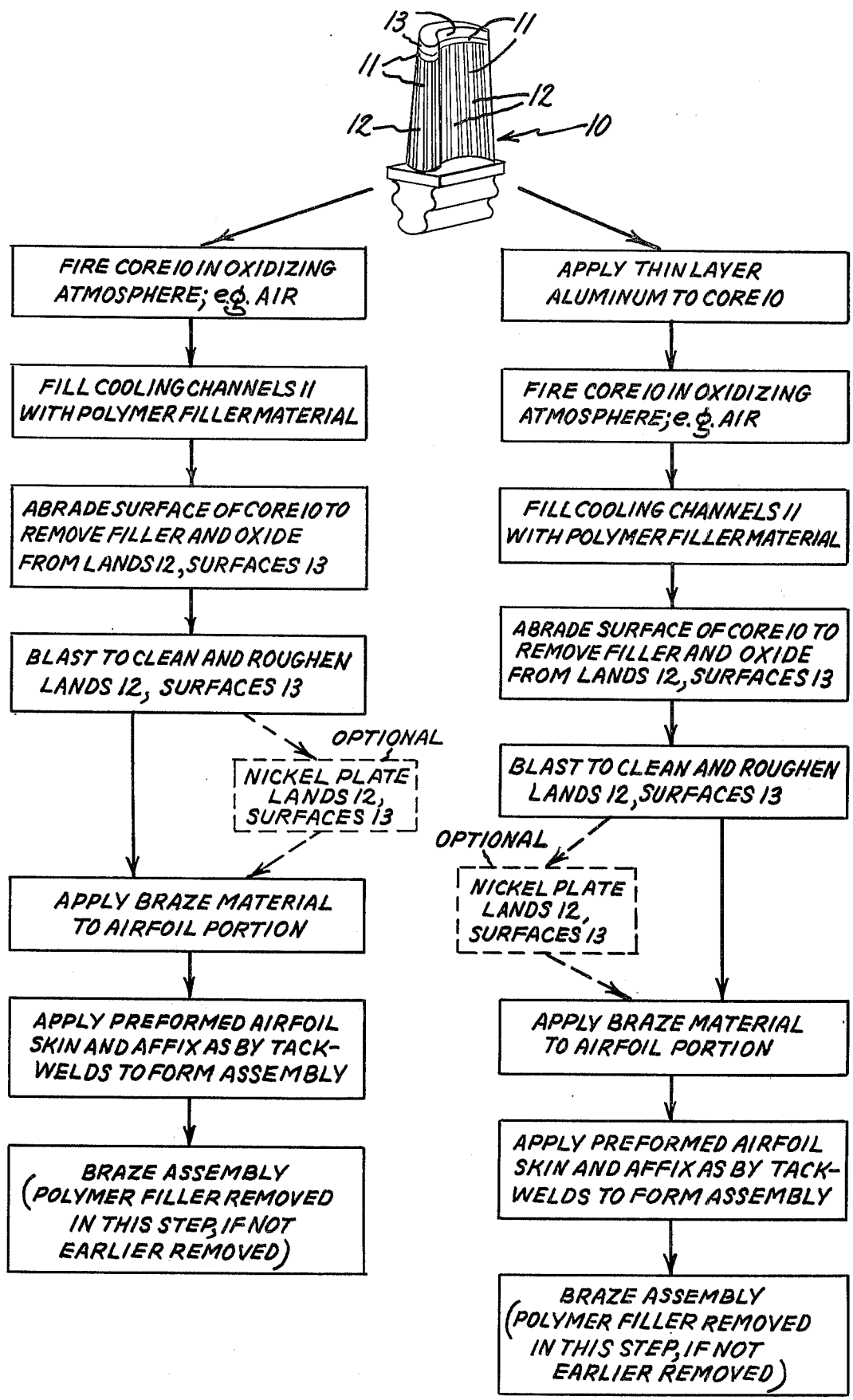

METHOD OF MANUFACTURE OF COOLED TURBINE OR COMPRESSOR BUCKETS

BACKGROUND OF THE INVENTION

A general process for producing a turbine or compressor blade having a plurality of passages therein relatively close to the surface for the passage of fluid therethrough for cooling the blade is set forth in U.S. Pat. No. 2,641,439 - Williams. An improvement on the Williams process is described in U.S. patent application Ser. No. 296,756—Grondahl (now abandoned) filed Oct. 12, 1972. The Grondahl application is assigned to the assignee of the instant invention and both the Williams' patent and the Grondahl application are incorporated by reference.

The Williams patent provides that in forming a turbine blade the surface of the core has formed therein a plurality of grooves separated by ridges. Cover for these grooves to provide closed channels for the conduct of cooling fluid during use is provided by plating a layer of metal over the bucket core, the grooves first being filled with a material such as aluminum, cadmium or a graphite-containing wax. Thereafter, one or more layers of metal are deposited thereover by electrodeposition forming the skin.

Next, the skin having been deposited and bonded in place, the patent describes the removal of the filler material to leave open passages defined by the grooves and the metal skin deposited thereover. According to the directions, when the filler material is aluminum, it would be removed by reaction with caustic soda. When the filler material is cadmium, it would be removed by heating to vaporization. When the filler material is a graphite-containing wax, it would be removed by melting.

The Williams' process can be successfully employed when the cooling channels are substantially larger in cross section than the capillary-size passageways employed in the liquid cooled turbine buckets described in U.S. Pat. No. 3,446,481—Kydd (incorporated by reference). It is particularly important that no plugging of the capillary size coolant channels occur to retard the flow of liquid coolant therethrough, because such turbines are intended to operate at very high temperatures and failure to cool any portion or portions of the blade surface can have very serious consequences.

In both the Williams patent and the Grondahl application the airfoil skin is produced in situ, as by electroplating. However, when the normal hydrogen or vacuum brazing process is employed to braze preformed skins to airfoil cores, the process renders all of the surfaces present clean (free of oxides or other contaminants). The braze material is free to and does flow over these surfaces. Blockage of cooling channels can occur by entry of the molten brazed material into the coolant channels. It is to the latter problem that the instant invention is directed.

DESCRIPTION OF THE INVENTION

Brazing of pre-formed skins on airfoil cores for the manufacture of nozzle partitions, turbine buckets or compressor blades is conducted in a dry hydrogen atmosphere or in a vacuum and normally all of the surfaces present are clean, free of oxides and other contaminants. Under these conditions the molten braze alloy is free to, and it does, flow over these surfaces at random with preferential flow being to the cleanest areas. Flow of the molten alloy into cooling channel recesses can obstruct or block the passage of coolant therethrough.

Having determined the mechanism by which the obstruction of cooling channels by braze material is promoted, in the practice of this invention, before bucket skins are brazed on the airfoil cores, the surfaces of the cooling channel walls are provided with a layer of oxide material. The oxide formation selected for this purpose must be one that is stable (not reducible) in dry hydrogen (e.g. aluminum oxide, titanium oxide, zirconium oxide). Thereafter, during conduct of the brazing operation, the oxide-covered sides of the cooling channels are not wet by the molten braze alloy and plugging of the cooling channels (now covered) during manufacture is greatly reduced. Plugging of these channels by braze material is substantially eliminated.

BRIEF DESCRIPTION OF THE DRAWING

The subject matter of the instant invention for which protection is sought is presented as claims at the conclusion of the written description of the invention set forth herein. The description sets forth the manner and process of making and using the invention and the best mode and the accompanying drawing forms part of the description schematically setting forth the applicable process flows. The left-hand flow diagram applies when material is initially present at the recessed surfaces of the cooling channels, which, when oxidized, will provide oxide surfacing that is not reducible in dry hydrogen. The right-hand flow diagram applies when such material is not initially present at the recessed surfaces of the cooling channels.

MANNER AND PROCESS OF MAKING AND USING THE INVENTION

When the airfoil core is made of an alloy having as constituents, one or more elements such as aluminum or titanium, that can form surface oxides that are non-reducible in dry hydrogen, the airfoil core is fired in the furnace in air at about 400° C for a short period of time (e.g. about 1 hour). The entire surface of the airfoil core will now be covered with a thin layer of non-reducible oxide. Typical alloy compositions that may be treated in this manner are Inconel 718, Inconel 738 and U500 or any others containing similar amounts of aluminum and/or titanium.

Next, the recessed cooling channels are filled with a readily depolymerizable polymer filler. This filler is applied by painting into the channels with a small camels hair brush, permitting each application to dry before applying more. This deposition is repeated until the channels have been filled (or overfilled) enough to withstand subsequent cleaning processes without exposing the oxide layer covering the channel surfaces. The airfoil core surface is then abraded (as with a belt sander) to remove any polymer filler and all of the oxide formation from the top of the lands between the cooling channels. Next, the airfoil core is bead blasted to remove excess polymer filler and oxide formation from small surface cavities missed in the abrading operation, the bead blasting also serving to roughen the surface of the lands.

The abrading and bead blasting operations will have exposed and cleaned only the tops of the lands and, preferably, the airfoil core next receives an electroplated coat of bright nickel (e.g. 0.2–0.6 mil coating) only on these exposed areas.

At this point in the process the polymer filler may be removed from the channels, as described hereinbelow, but this is optional. If there is need for extra support for the airfoil skin, which is to be applied next during the skinning operation, the polymer material may be left in place for removal during the brazing operation. Removal of the polymer filler is quickly (about 30 seconds) accomplished in a vapor degreaser where it is exposed to, and dissolved by, hot solvent (e.g. trichloroethylene) vapors.

Next, the airfoil core is prepared for brazing of the skin. the braze material is applied to the core surface in the form of a thin (e.g. 0.7 mil) sheet, or assuming the polymer filler has been previously removed, disposed in the channels as thin wires or together with depolymerizable powder as a binder therefor. Among the useful braze materials are most of the Nicrobraz series of alloys, silver brazes such as Nicusil 3 and Nicusil 559 (Handy and Harmon), and Nioro, Nicoro 80 or Palniro 7 (Western Gold and Platinum). Practically all of the braze metals used, with the exception of copper, are used in an alloy form. Most are alloys of gold, silver, or nickel using copper, silicon, boron, tin, etc. as alloying elements. The alloys are used, because they have melting temperatures, which are usually much lower than the melting temperatures of the principal constituent.

Excess braze metal should not be used, however and the correct amount for a given braze joint is determined by experiment or previous experience.

The airfoil skin, which may be of the same material as the airfoil core, or different, if particular properties are desired is then applied. This skin, which has been preformed, is pressed into place against the core surface and tack-welded in place.

The brazing operation (airfoil skin to airfoil core) is conducted in a hydrogen environment or in a vacuum at 500°–600° C. If desired, initially a vacuum may be employed with hydrogen being admitted later in the brazing operation.

Since the recessed cooling channels are roughly square or rectangular in cross section, the only side of each channel presenting a clean surface, which the braze alloy can wet and flow over is the skin side. The three sides of the channel that are recessed into the airfoil core will not be wet by the braze alloy. Thus, with the braze alloy only being able to wet one side of the channel, the possibility of producing channel plugging with the braze alloy is substantially removed.

In those instances in which the material of which the airfoil core is made will not provide the requisite oxide coating upon being heated in air, the airfoil core is cleaned chemically (acid etch) or vapor blasted and a coating of pure aluminum (about 1000–2000 A in thickness) is vapor deposited or sputtered over the surface thereof. Next, the part is fired in an air furnace at 400° C for about 1 hour to produce a coating of aluminum oxide of sufficient (several Angstroms is enough) thickness on the surface. Leaving the aluminum coating intact will prevent undesirable oxidation of the airfoil core surface. Next, the recessed cooling channels are filled with polymer filler as described hereinabove and the abrading and bead blasting operations are conducted to remove polymer filler and aluminum oxide from the tops of the lands.

Next, preferably, a coating of bright nickel (about 0.2 to about 0.3 mils in thickness) is electroplated, covering only the tops of the lands. This application of nickel improves wetting by the braze alloy. Thereafter, the polymer filler may be removed in a vapor degreaser or in a solvent At this point in the operation, the three sides of the recessed channels are covered with aluminum oxide. When the braze material and airfoil skin are applied over the surface of the core for the brazing operation, as described above, only the tops of the lands and the airfoil skin present clean surfaces which the braze alloy may wet and over which it may flow. Next, the brazing operation is conducted in a hydrogen environment or in a vacuum, the channels of the airfoil being substantially free of the problem of channel blockage by the intrusion of braze alloy material.

The effectiveness of the process of this invention to minimize the blockage of cooling channels by incursions of brazing alloy was checked by utilizing the process of the instant invention to apply a skin of Carpenter X-15 alloy over an airfoil core of this same material using silver braze alloy. The airfoil surface of the bucket core had capillary-size cooling channels recessed into the surface thereof. The skin was then peeled off the core and both the skin and the airfoil core were examined. It was found that braze alloy wet all of the skin surface in contact with the core, but that the cooling channels were either completely free of braze alloy or had only a very thin (Angstroms thick) layer on the sides of the channel walls and only a blush of silver braze alloy creeping from both side walls, but yet not meeting in the middle of the channel. It is estimated that this blush of braze alloy probably was less than 3000 A thick.

Depolymerization polymer filler materials useful in the practice of this invention include polymethacrylates (e.g. polymethylmethacrylate, polyisobutyl methacrylate, etc.), polyoxymethylene, polychloral, poly-1,1-diphenylethylene, poly-2,4-dimethyl styrene, polymethacrylonitrile, poly-N-hexyl isocyanate, and other polymers readily selectable for this use by reference to section II, (pages 38–95) of the Polymer Handbook (Edited by J. Brandrup et al., Interscience 1966).

The phenomenon of depolymerization as defined herein requires that the polymer be readily converted to monomers and that there be no charred residue. With materials meeting these criteria (unless the polymer has been previously removed by dissolution) the brazing operation, which is conducted at a temperature in excess of both the depolymerization temperature and the boiling point of the monomers, will suffice to completely remove the polymeric filler material.

BEST MODE CONTEMPLATED

The invention differs in its application only in whether or not material is initially present at the recessed surfaces of the cooling channels, which material, when oxidized will provide oxide surfacing that is not reducible in dry hydrogen. Thus, if the airfoil core is made of an alloy such as Inconel 718, among the constituents of the alloy are aluminum (0.8% by weight), titanium (0.65–1.40% by weight) and columbium (4–5% by weight), all of which provide the desired surface oxide material in sufficient concentration. Any other alloy material providing aluminum, titanium, columbium and/or zirconium in similar concentrations would be treated in the same manner.

Thus, to skin an airfoil core of Inconel 718 having recessed cooling channels, the core is fired in an air furnace at about 400° C for about 1 hour. Any clean surface that may have been present will now be entirely covered with a thin (Angstroms or even atoms thick) layer of oxide material not reducible in dry hydrogen.

Next, the recessed channels are filled with clear isobutyl methacrylate. The airfoil core is then sanded with a belt sander to smooth off the airfoil surface and remove all polymer and oxides from the top of the lands. The bucket core is then bead (glass or alumina) blasted to remove excess polymer and oxides residing in small cavities (surface imperfections) from which these materials were not removed by the sanding operation.

As the next step, the bucket core was subjected to electrodeposition and, since only the tops of the lands were exposed and cleaned, these areas alone were plated with a coating of bright nickel (0.2–0.3 mils thick). The purpose of the nickel plating is to provide specific areas, which will be sought out by the molten brazing material in the brazing operation to follow. Having completed its protective function, the polymer filler is removed by the temperature exposure caused by the brazing operation.

In preparation for the brazing operation, the airfoil core is wrapped with a thin foil of braze alloy (e.g. Nioro 82% Au, 18% Ni; Nicoro 80 81.5% Au, 16.5% Cu, 2.0% Ni; Palniro 7 70% Au, Pd 8%, 22% Ni—all percentages by weight), the airfoil skin is then applied over the airfoil core, conformed thereto and tack-welded. This assembly is then subjected to the normal hydrogen brazing process (temperature 900°–1100° C depending on the braze alloy used). Examination and testing of the completed airfoil indicated that all cooling passages remained open.

An airfoil core made of Carpenter X-15 alloy was provided with an airfoil skin in a different manner, because this alloy can be deoxidized in dry hydrogen. Thus, the airfoil core was cleaned and then the surface thereof was covered with a layer (1000 –2000 A in thickness) of pure aluminum by vapor deposition. Thereafter, the steps of the process were the same as those employed in the case of Inconel 718.

What I claim as new and desire to secure by Letters Patent of the United States is:

1. In the method of preparing an airfoil-shaped body in which a metal skin is applied over and bonded to an airfoil core by brazing in dry hydrogen or in a vacuum, said core having channels recessed into the surface thereof whereby conduits are defined below said metal skin in the completed body, the improvement comprising the steps of:
providing a layer of oxide material over the entire surface of said core, said oxide material being stable in dry hydrogen at temperatures at least as high as about 1100° C,
filling said channels with a polymer filler material,
cleaning the surface of said core to remove oxide and polymer material except from the surface area of said channels,
applying braze material to said core,
conforming a preformed metal skin to the surface of said core,
temporarily affixing said skin to the surface of said core to form an assembly and
brazing said assembly, 2. The improved method of claim 1 wherein the layer of oxide material is provided by depositing a thin metal coat over the core and then heating said core in an oxidizing environment to provide a layer of the oxide of said metal extending over the entire surface of said core.

3. The improved method of claim 2 wherein the metal coat is of aluminum.

4. The improved method of claim 3 wherein the aluminum coat is about 1000–2000 A in thickness.

5. The improved method of claim 1 wherein the core material is an alloy containing at least one metallic component from the group consisting of aluminum, titanium, zirconium and columbium and after removal of the oxide and polymer material from the core surface, a thin coating of bright nickel is applied to the surfaces so cleaned.

6. The improved method of claim 5 wherein the polymer material is removed from the channels after application of the nickel coating and before the application of the skin to the core.

7. The improved method of claim 5 in which the layer of oxide material is provided by heating the core in an oxidizing environment to provide an oxide layer extending over the entire surface of said core.

8. The improved method of claim 1 wherein the polymer filler material is isobutyl methacrylate.

9. The improved method of claim 1 wherein the cleaning is accomplished by an abrading operation followed by bead blasting of the exposed core surface.

10. The improved method of claim 1 wherein the braze material is applied to the core as thin sheet material.

11. The improved method of claim 1 wherein after the cleaning step the polymer filler material is removed from the channels and, thereafter, the braze material is applied to the core as thin wires disposed in the empty channels.

12. The improved method of claim 1 wherein after the cleaning step the polymer filler material is removed from the channels and, thereafter, the braze material is applied to the core in the empty channels as a powder mixed with a depolymerizable polymer material.

* * * * *